United States Patent [19]
Hornstein et al.

[11] Patent Number: 5,623,815
[45] Date of Patent: Apr. 29, 1997

[54] MOLDED BIODEGRADABLE PACKAGING

[75] Inventors: Richard R. Hornstein, Upp. Saddle River; Grady F. Landrum, Morristown, both of N.J.

[73] Assignee: Norel, Little Ferry, N.J.

[21] Appl. No.: 550,933

[22] Filed: Oct. 31, 1995

[51] Int. Cl.⁶ .............................. B65B 55/00; B65B 23/00
[52] U.S. Cl. ................................ 53/472; 53/431; 53/474; 53/115; 53/239
[58] Field of Search ............................... 206/205, 524, 206/584, 521; 53/472, 431, 440, 115, 122, 127, 474, 239

[56] References Cited

U.S. PATENT DOCUMENTS

| | | | |
|---|---|---|---|
| 2,897,641 | 8/1959 | Simon et al. | 53/472 X |
| 3,446,882 | 5/1969 | Landon | 53/472 X |
| 3,450,243 | 6/1969 | Nielsen | 53/472 X |
| 5,152,121 | 10/1992 | Nakamura | 53/431 |
| 5,186,990 | 2/1993 | Starcevich | 206/584 X |
| 5,362,776 | 11/1994 | Barenberg et al. | 206/584 X |
| 5,472,779 | 12/1995 | Cann et al. | 206/584 X |

FOREIGN PATENT DOCUMENTS

WO92/04253  3/1992  WIPO ..................................... 206/584

*Primary Examiner*—Horace M. Culver
*Attorney, Agent, or Firm*—Kane, Dalsimer, Sullivan, Kurucz, Levy, Eisele and Richard

[57] ABSTRACT

The disclosure is of a method and apparatus for packaging articles, and cushioning the packages with biodegradable, starch based materials. The materials, packed as loose nuggets within the package, are converted to a single, unitary cushion in-situ to protect the article.

7 Claims, 2 Drawing Sheets

MOLDED BIODEGRADABLE PACKAGING

BACKGROUND OF THE INVENTION

1. Field of The Invention

The invention relates to methods and apparatus for packaging articles and more particularly relates to molded, biodegradable materials employed to package articles for shipment and storage.

2. Brief Description of The Prior Art

A concise summary of the state of the art appears in U.S. Pat. No. 5,362,776 wherein it is stated that:

"Several problems are associated with conventional packaging materials, such as expanded polystyrene peanuts."

The patentee in the U.S. Pat. No. 5,362,776 approaches the problems associated with the state of the art by providing a cellulosic, recyclable product in admixture with a softener and a water-soluble binder. The softener is in fact glycerin, deemed essential to the invention. A percentage of residual water is also required, which can adversely affect some moisture-sensitive articles for packaging.

A primary problem associated with the use of all of the cushioning materials described above, concerns their loose disposition within the package holding the article. The materials are subject to movement and shifting due to handling. When the package is opened, the loose fill also creates clean-up and disposal problems. Of course, these clean-up problems are not associated with the earlier in-situ foam packaging techniques (see for example the descriptions in U.S. Pat. Nos. 3,190,442 and 3,204,385) employing synthetic resin foams generated in the spaces around an article to be shipped. Unfortunately, these synthetic resin foams are generally not environmentally acceptable for disposal and/or use. They also require relatively long cure times, before the foam is completely formed and hardened.

The method and apparatus of the invention represents an improvement in the art, in that biodegradable, environmentally acceptable, loose materials are employed which are molded into solid cushions which conform to the spaces to be filled around an article, within a package.

SUMMARY OF THE INVENTION

The invention comprises a method of packaging an article in a container, which comprises;

providing a container having a bottom and a sidewall;

placing an article for packaging in the container, leaving a space between the article and the container bottom and sidewall;

providing a quantity of loose nuggets, said nuggets being defined at least in part by an exposed surface of a starch material;

gelatinizing the starch material in at least a portion of the nuggets;

packing the nuggets adjacent to each other in the space between the article and the container bottom and sidewall, with nuggets having gelatinized starch surfaces in contact with surfaces of adjacent nuggets; and allowing the gelatinized starch to retrograde, whereby adjacent nuggets adhere together at sites of contact.

The invention also comprises the packaged articles and apparatus for carrying out the method of the invention.

DETAILED DESCRIPTION OF THE PREFERRED EMBODIMENTS OF THE INVENTION

Figure 1:
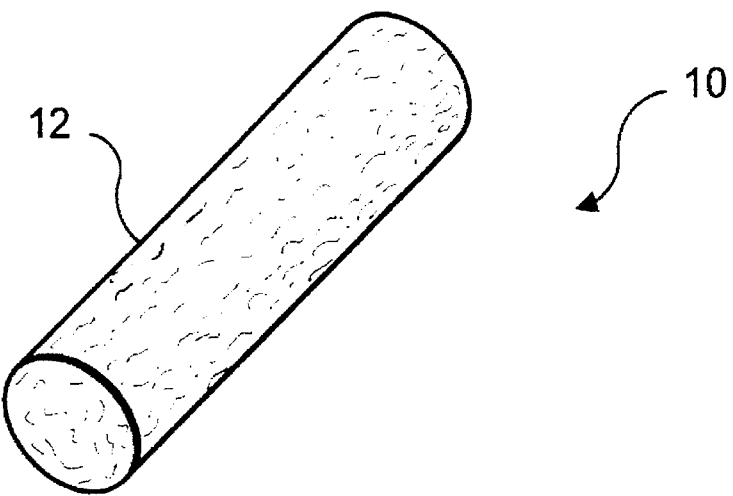
FIG. 1 is a view-in-perspective of a starch-containing nugget of the prior art, employed in the present invention.
Figure 2:
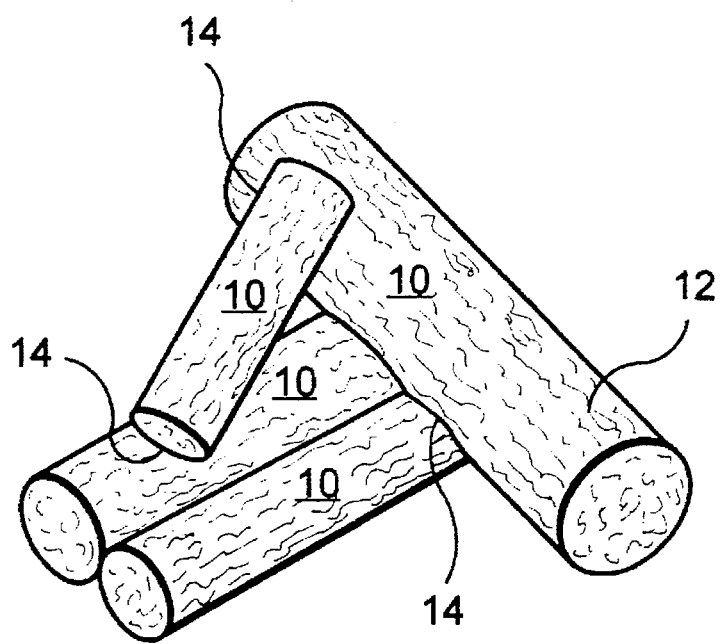
FIG. 2 is a side view showing a plurality of nuggets as shown in FIG. 1, adhered together at points of contact between adjacent nuggets to form a solid cushion to protect a packaged article.
Figure 3:
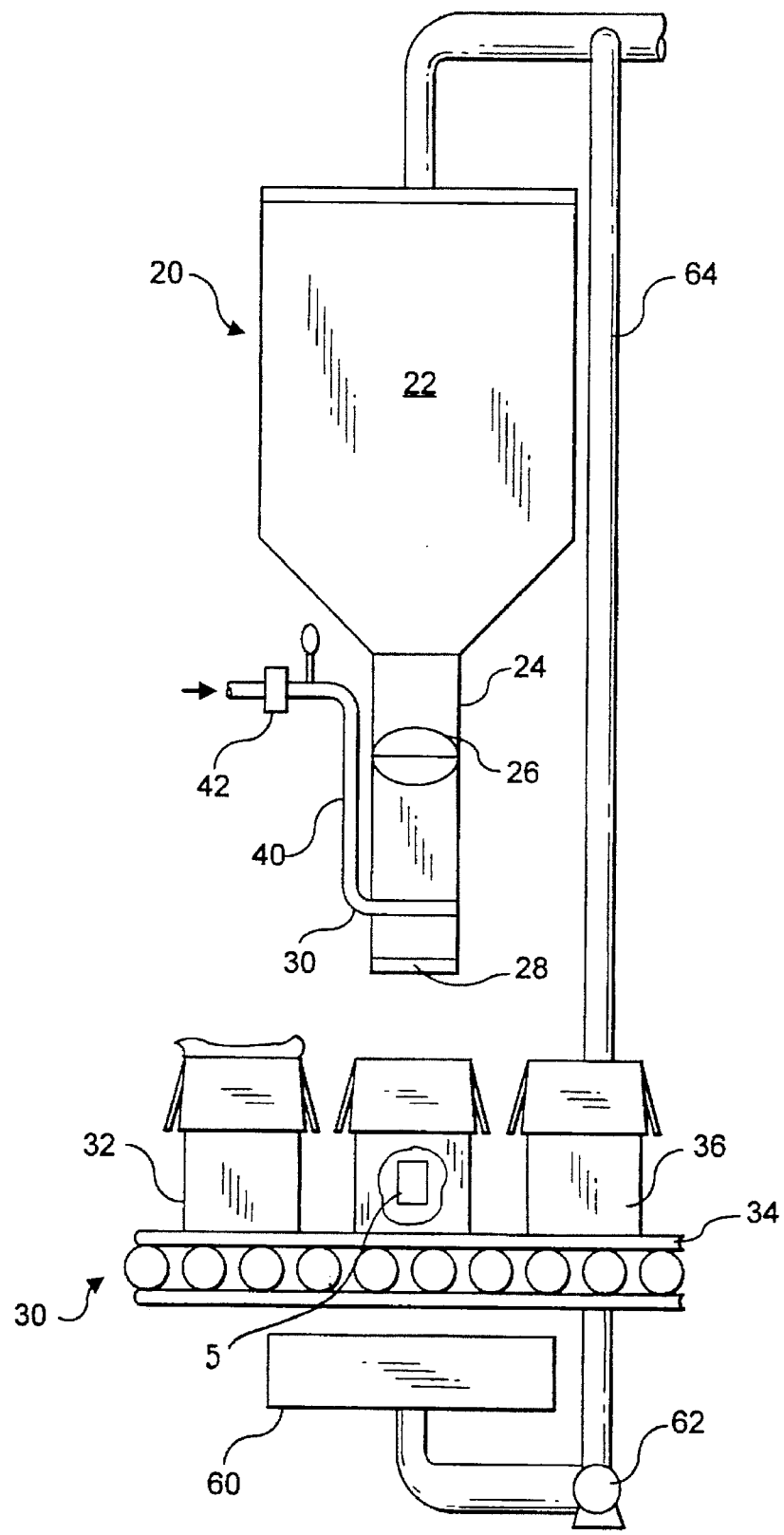
FIG. 3 is a cross-sectional view of embodiment apparatus of the invention, shown in association with a process line for carrying out the method of the invention.

Those skilled in the art will gain an appreciation and understanding of the invention from a viewing of the accompanying drawings of FIGS. 1–3 in conjunction with a reading of the following description of the preferred embodiments of the invention.

Referring first to FIG. 1, there is seen a perspective view of an embodiment nugget 10 employed in the method of the invention. The nugget 10 is a conventional packing material used in the prior art to package articles. The nugget 10 may be, for example, a biodegradable, shaped and expanded starch containing product such as described in the U.S. Pat. Nos. 4,863,655; 5,035,930; and 5,043,196, all of which are hereby incorporated herein by reference thereto. The essential feature of the nugget 10 is definition, at least in part, by an exposed surface 12 of a starch material. Starch materials include unmodified natural granular starches such as regular cereal, potato, and tapioca starch, and flours containing the same, as well as mixtures of these with waxy starches and high amylose starches. Full-fat starches, that is, starches which have not had a portion of the bound fat removed, are suitable for use herein.

Starch is a low-cost and abundant natural polymer composed of amylose and amylopectin. Amylose is essentially a linear polymer having a molecular weight in the range of 100,000–500,000, whereas amylopectin is a highly branched polymer having a molecular weight of up to several million. When starch is gelatinized in water and cooled, the amylose retrogrades to a much greater extent than the amylopectin fraction. Retrogradation is a term applied to the phenomenon whereby starch chains in dispersion associate, become insoluble, and precipitate. The rate and extent of retrogradation depend on properties of dispersion and on the amount of amylose present in the dispersion. While common cornstarch (pearl) contains about 25% amylose and 75% amylopectin, the waxy corn starches contain only amylopectin and those referred to as high-amylose starches contain up to 75% amylose.

A preferred starch material for the low density, biodegradable nuggets 10 employed in the method of the invention are the expanded material described in U.S. Pat. No. 4,863,655. Starches having an amylose content of up to about 25% gelatinize at a temperature of about 120° to 135° C. Starches having greater than about 25% amylose require temperatures of about 155°–160° C. Gelatinization at lower temperatures does not cause complete granule rupture, while gelatinization at higher temperatures causes some starch depolymerization. Steam-injection is a preferred method of gelatinization because it affords the advantage of providing a continuous process.

When surface portions 12 of nuggets 10 are gelatinized, the surface 12 becomes tacky and adhesive in nature. If the gelatinized surfaces 12 are brought into contact with adjacent nuggets 10, and retrogradation allowed to occur, the nuggets 10 will adhere and bond together at contact sites 14 as shown in FIG. 2. A solid structure is thereby made from a plurality of loose nuggets 10, which forms a single, integrated and solid cushion of material which can effectively cushion an article to be packaged in a container.

Referring now to FIG. 3, there is seen a cross-sectional side view, embodiment apparatus 20 of the invention for carrying out the method of the invention. The apparatus 20 comprises a storage hopper 22 for holding a quantity of loose nuggets 10 as described above. A tubular conduit 24 in open communication with the interior of hopper 22 carries the nuggets 10 downward by force of gravity to a valve 26 which acts as a gate to restrict flow of the nuggets 10 within conduit 24. The lower, open end 28 of conduit 24 functions as a nozzle to direct the falling nuggets 10, when not restricted in passage by valve 26, into a process line for carrying out the method of the invention. The process line comprises a conveyor line 30 carrying containers 32 beneath conduit 24 open end 28, to receive nuggets 10 as space filler to fill the space between a contained article for shipment, the container 32 bottom 34 and sidewalls 36. Prior to the deposit of nuggets 10 into containers 32, and before leaving the open end 28 of conduit 24, at least a portion of the nuggets 10 are wetted with steam inserted into the conduit 24 through a spray nozzle 30 circumscribing the interior of conduit 24 near the open end 28. The spray nozzle 30 dispenses a spray of steam received from steam supply line 40 upon actuation of valve 42. The wet steam functions to gelatinize surfaces 12 of the nuggets 10 as previously described, immediately after release by valve 26 but before deposit into container 32 from conduit 24 open end 28. The brief, momentary exposure to wet steam serves to gelatinize only surface portions 12 of the nuggets 10 and not the whole of the nugget 10, or even the whole of dispensed nuggets 10. However, our experience has been that with a conduit 24 having a diameter of about 4 inches, more than about 35 percent of the nuggets 10 will have surface 12 portions subjected to gelatinization. As the nuggets 10 fill and occupy the space between the article 50 and the bottom 34 and sidewalls 36 of containers 32, adjacent nuggets 10 pack together and where they make contact with gelatinized surfaces 12 will adhere together and form a solid, integrated cushion from the previously loose filled nuggets 10. The gelatinization is so light and minimal that within 1 to 3 minutes of making contact, retrogradation occurs and the nuggets 10 become firmly adhered at contact sites. Although this adherence is strong enough to resist shifting of the individual nuggets during handling of the package, the frangibility of the adhered mass is such that upon unpacking of the article 5, the cushion can be easily broken up and disposed of in an environmentally sound manner, i.e.; by dissolution and degradation with water.

In a preferred apparatus 20 of the invention, nuggets 10 which fall free of deposit within container 32 can be recycled from a trough 60 by blower 62 to hopper 22 through conduit 64.

Those skilled in the art will appreciate that many modifications may be made to the preferred embodiments described above, without departing from the spirit and the scope of the invention. For example, the articles 5 for packaging according to the method of the invention may be pre-wrapped in a film of a synthetic polymeric resin such as polyethylene for additional protection.

What is claimed is:

1. A method of packaging an article in a container, which comprises;

providing a container having a bottom and a sidewall;

placing an article for packaging in the container, leaving a space between the article and the container bottom and sidewall;

providing a quantity of loose nuggets, said nuggets being defined in part by an exposed surface of a gelatinizable starch material;

gelatinizing the starch material of the surface in a portion of the nuggets;

packing the nuggets adjacent to each other in the space between the article and the container bottom and sidewall, with nuggets having gelatinized starch surfaces in contact with surfaces of adjacent nuggets; and allowing the gelatinized starch to retrograde, in one to three minutes, whereby adjacent nuggets adhere together at sites of contact; to form a solid, integrated and unitary cushion within the space between the article and the container bottom and sidewalls, said cushion being frangible and easily broken up and disposed of.

2. The method of claim 1 wherein the nuggets are shaped, foamed natural polymers of starch.

3. The method of claim 1 wherein the starch is gelatinized by exposure to steam.

4. The method of claim 1 wherein the article is covered first with a film of a synthetic polymeric resin.

5. The method of claim 1 wherein the space at the container bottom is packed with nuggets, the article is placed in the container on said nuggets and the space between the placed article and the sidewall is then packed with nuggets.

6. Apparatus for packaging articles within a shipping container, which comprise;

means for holding a quantity of loose nuggets of a biodegradable, shaped material defined at least in part by an exposed starch surface;

conduit means in open communication with the means for holding, at a location wherein the loose nuggets will flow by gravity into the conduit means;

a valve associated with the conduit means for controlling flow of the nuggets through the conduit;

means for applying to at least a portion of the exposed surfaces of the nuggets as they flow through the conduit means, a wet stream whereby the surfaces are gelatinized; and a portal on the conduit means distal to the means for applying wet stream, for discharge of the nuggets with gelatinized surface to a package.

7. The apparatus of claim 6 wherein the stream is steam.

* * * * *